United States Patent Office 2,955,146
Patented Oct. 4, 1960

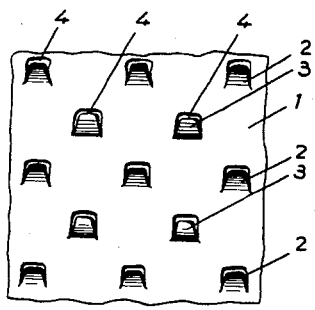
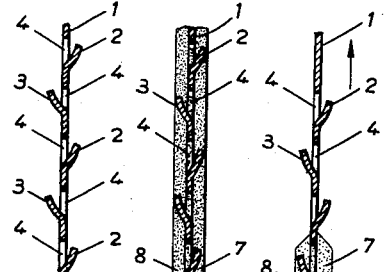
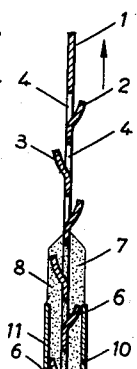
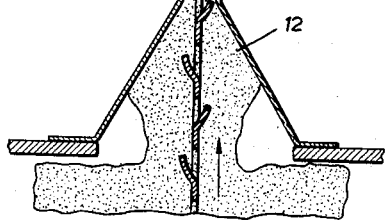
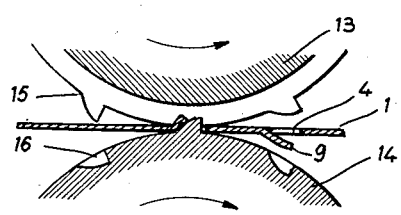
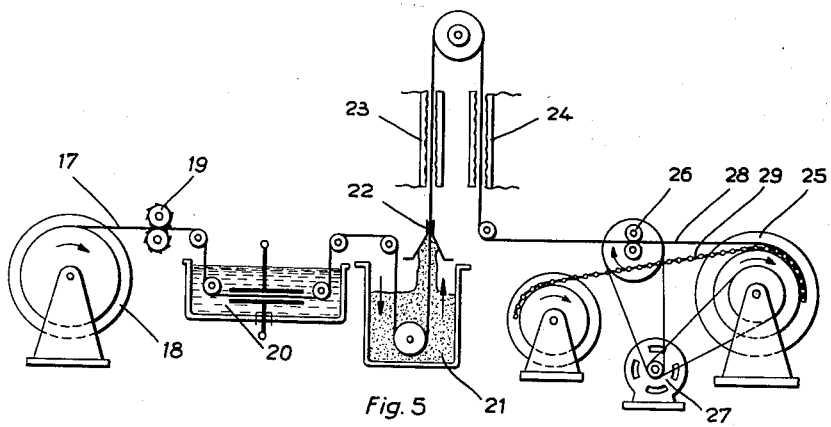

2,955,146

POROUS SINTER-FRAME FOR THE STORAGE OF THE ELECTRO-CHEMICALLY ACTIVE SUBSTANCE OF AN ACCUMULATOR ELECTRODE

Hans Vogt, Haus Nr. 25, Erlau, near Passau, Germany

Filed Aug. 16, 1957, Ser. No. 678,469

Claims priority, application Germany Aug. 25, 1956

2 Claims. (Cl. 136—61)

The present invention relates to a porous sinter-frame for the storage of the electro-chemically active substance of an accumulator electrode in the pores of the sinter-frame.

There are already known to the art electrodes for accumulators in which the electro-chemically active electrode substance is fed into the pores of a sinter frame, whereby this sinter-frame forms the one-sided or both-sided sinter coating of a supporting element. In this the supporting element serves as a mechanical stabilizing element of the electrode frame, and usually it is also devised to serve as a contact connection of the electrode. In the continuous manufacture of sinter frames of this kind for accumulator electrodes the supporting element is used as a moving transporting means for the metal powder to be sintered to the porous frame.

If for the manufacture of the aforedescribed electrode sinter-frames (particularly extremely thin sinter-frames) a method is employed in which the supporting element has to pass through a metal-powder-emulsion or the like in order to coat the supporting elment with a layer of emulsion, whereupon, after the coating has been effected, the coating and its supporting element are sintered, then the difficulty resides in producing upon the supporting element very thin and uniformly thin coatings. But, for the orderly functioning of accumulators operated in gas-tight vessels, particularly of alkaline accumulators, it is an absolute necessity that the storage layers of electro-chemically active substances of the electrodes are of small thickness, preferably exceedingly small thickness, and that the thickness of all electrodes operated in a gas-tight accumulator is a uniform one to the highest possible degree, particularly in order to obtain rectangular discharge curves. Technically it is extremely difficult to produce by means of an economically operable method supporting elements with electro-frames of perfectly uniform thickness sintered onto them, as the adhesiveness of the layer depends to a very high degree upon the temperature of the adhesive means, upon the time of passage, and upon the pre-drying period etc.

The invention starts from the aforedescribed state of technique and operates with a porous sinter-frame for the storage of the electro-chemically active substance of an accumulator electrode in the pores of a sinter-frame which is intimately united with the supporting element, whereby the supporting element is characterized by the feature that it is provided with surface-unevennesses which project through the width or thickness of the sinter-frame applied to either one surface or both surfaces of the supporting element. Accordingly, the maximum thickness of the supporting element is determined by the height of its surface unevennesses or surface projections and corresponds to the thickness of the sinter-frame-electrode produced with the aid of the supporting element.

The use of a supporting element like this provided with surface unevennesses has the considerable technical advantage that, while the already known and economically favorable method of the continuous application of a metal-powder-paste to the supporting element is retained, the projecting unevennesses of the supporting element serve as thickness limitations for the supporting element plus the one or two coats of metal-powder-paste applied to its surfaces when the supporting element is passed through a strip-off or doctoring contrivance. For this reason it is advisable to provide the entire surface of the supporting element with as many projections as possible in order to obtain in this way continuous uniform guiding means for the strip-off device to engage during the continuous passage of the supporting element and its coatings. Especially suited for carrying out the invention are supporting elements provided with projecting surface unevennesses of wart-like formation, while the flat portions between the wart-like projections guarantee a good adhesion of the mass of metal powder at the surface of the supporting element during its passage through the strip-off device.

Particularly suited as supporting elements are perforated metal-foil-strips or metal-foil-bands which, after the perforation has been effected, can have the projecting unevennesses—resulting from the perforation—equalized in height by rollers or the like. If the supporting elements are to be coated on both surfaces with the sinter-frame-layers the projecting unevennesses are preferably so positioned that they are alternately active on either one side or the other of the supporting element and as seen clearly in Figs. 1–4 inclusive, the same projections or projecting unevennesses overhang the perforations or openings formed in the strip when they are made.

Additional features and advantages of the invention will be understood from a consideration of the following detailed description taken in connection with the accompanying drawings forming a part of this specification and in which an embodiment of the invention has been shown by way of example. However, I wish to say that the invention is not confined to any strict conformity with the showing of the drawings but may be changed or modified, so long as such changes or modifications mark no material departure from the salient features of the invention as expressed in the appended claims.

In the drawings in which like parts are referred to by the same reference numerals, Fig. 1a is a top plan view of a portion of an iron-foil-strip provided with perforations and projections of grater-like formation;

Fig. 1b is a side view of the strip showing the bulging portions or projections and the openings which these projections overlie and which are formed by these projections when the latter are forced laterally out of the strip;

Fig. 2 is a side view showing the strip coated on both surfaces with the layers of metal powder of uniform thickness;

Fig. 3 is a side view showing how the bulging portions or projections are forced out of the strip by means of a roller provided with projecting cutting teeth engagable in corresponding recesses of a cooperating roller;

Fig. 4 is a vertical cross-section showing how the free ends of the bulging portions cooperate with strip-off or doctoring means for the production of a sinter-frame of uniform thickness;

Fig. 5 diagrammatically shows the method of the invention employed for the continuous production of sinter-frame-strips or bands of uniform thickness.

Referring now to the drawings in detail, Fig. 1a shows a perforated nickel-plated iron foil 1 of grater-like formation and of a thickness of 0.04 mm. As will be seen from Fig. 1b, the bulging partially punched-out portions 2 and 3 form surface unevennesses on both sides of the metal foil 1, and it will be noticed that the bulging portions are forced out of the metal foil in such manner that openings 4 are produced which longitudinally as well as in transverse direction are positioned closely beside one another. The bulging portions 2 and 3 overhang the respective openings 4 resulting from their formation and guarantee good adherence of the nickel powder 5 (to which for that purpose an adhesive means is admixed) to the surface of the strip of metal foil. Furthermore, these bulging portions form transversely projecting thickness limitation means 6 for the equalizing of the thickness of the layers of powdery material 7 and 8 forming the sinter-frame coatings. The ends 9 of the bulging portions 2 and 3, projecting in tongue-like fashion, determine the thickness of the coatings of the strip of iron foil. They extend through the width of the highly porous sinter-frame formed by the layers of powdery mass 7 and 8 which via the openings 4 effectively electro-chemically connect the two electrode-sides.

The effect produced by the bulging partially punched out portions 2 and 3 as transversely extending projections when the coats of powdery mass 7 and 8 are applied to the metal foil 1, as illustrated in Fig. 4. The strip-off or scraping sheet members 10 and 11 rest, when the metal foil 1 passes between them, against the free ends of the tongue-like projections 9, so that the excess of powdery mass 12 is stripped off and that the coats of powdery mass 7 and 8 are equalized in thickness.

How the bulging partially punched out portions 2 and 3 are forced out of the strip of metal foil 1 is shown in Fig. 3. The two rollers 13 and 14 are provided with recesses 16 and with projecting cutting teeth 15 engaging in the recesses 16. The teeth 15 are so shaped that they work as cutting tools only with their pointed forward ends, while the rear-ends of the teeth produce the bulging portion in the metal foil 1.

Fig. 5 shows the application of the invention for the production of continuous band-like supporting foils coated with sinter-frames for alkaline accumulators. The iron band 17 of foil-like thinness passes from the storage roller 18 via the perforating device 19, the nickel bath 20, the mass of nickel powder 21, the equalizing contrivance 22, the drying- and pre-sinter oven 23, the oven for the finish sintering 24, and is then wound with its both-sided highly porous sinter-layers onto the roller 25. A pair of conveying rollers 26 effect the continuous transport of the band-like supporting foils through the aforesaid devices. This latter pair of rollers as well as the roller 25 are driven from the motor 27. The sinter-frame-band 28 is wound onto the roller 25 in such fashion that there is produced between the individual layers of coils, through introduction of the spacer band 29 between them a space of suitable width for the impregnating of the sinter-frame-band. The spacer 29 is valuable also for the avoidance of surface injuries when the sinter-frame-band 28 is wound onto the roller 25, as it prevents the sinter-band-coils from coming in contact with each other, which is important particularly when there are considerable surface unevennesses. It will be seen that according to the invention the production of the sinter-frame-band is effected in continuous succession through passage through successively arranged contrivances, whereby the accurate thickness of the band, particularly the very small thickness of the sinter-frame-layers applied to the supporting band 17, is taken particular care of.

What I claim as new and desire to secure by Letters Patent of the United States is:

1. The method of manufacturing in a continuous manner a porous supporting element for the storage in the pores thereof of the electrochemically-active substance of an alkaline accumulator electrode comprising the steps of feeding a continuous band of nickel-plateable metallic foil between a pair of cooperating rollers having projecting radial cutting teeth and complemental peripheral recesses therein to receive said cutting teeth to form partially punched-out uniform projections extending outwardly from at least one side of said foil and overhanging the resulting holes in the foil, then feeding the foil through a nickel plating bath, then feeding the plated foil through a storage tank containing a nickel-powder-mass to provide a layer of said mass contiguously on at least one of the foil sides having said outward projections, then passing said coated foil through spaced scraping means to remove excess nickel powder extending outwardly beyond the maximum height of said projections so that the layer of nickel powder will be of uniform thickness, and then feeding the coated strip through an oven to sinter said nickel powder layer therein.

2. That improvement in the method of manufacturing in a continuous manner of a porous supporting element for the storage in the pores thereof of electrochemically active substance of an alkaline accumulator electrode comprising the steps of continuously moving a foil of nickel-plateable metallic foil of substantially uniform thickness and during movement of the foil first punching out laterally extending integral projections on both faces of the foil, leaving resulting openings in the foil that the respective projections overhang, then coating all surfaces of the moving projection bearing foil with nickel in a nickel plating bath, then simultaneously applying a nickel powder mass as layers to both faces of the moving nickel-plated, projection bearing foil with the powder mass extending also through the openings in the foil so that the two layers are interconnected by such mass extensions and all exposed faces of the nickel plated foil are covered by said nickel-powder mass, then while maintaining the mass bearing foil in continued motion removing excess mass in the layers on the faces of the foil simultaneously so that both layers have like dimensions each equal in height approximately to the maximum heights of the projections extending from the respective faces of the foil, and then while still maintaining continuous motion of the layer-bearing, scraped foil sintering the nickel powder in the layers.

References Cited in the file of this patent

UNITED STATES PATENTS

| 556,782 | Sussmann | Mar. 24, 1896 |
| 693,757 | Taylor | Feb. 18, 1902 |
| 880,957 | Aylsworth | Mar. 3, 1908 |
| 1,369,353 | Rabe | Feb. 22, 1921 |
| 2,681,375 | Vogt | June 15, 1954 |
| 2,724,733 | Ragspihl | Nov. 22, 1955 |
| 2,739,179 | Barrett | Mar. 20, 1956 |